United States Patent [19]

Sorensen

[11] Patent Number: 4,552,208

[45] Date of Patent: Nov. 12, 1985

[54] HEAT ACTUATED SYSTEM FOR CIRCULATING HEAT TRANSFER FLUIDS

[76] Inventor: Wilfred Sorensen, 26 Center St., Kingston, Ontario, Canada, K7L 4E6

[21] Appl. No.: 275,917

[22] Filed: Jun. 22, 1981

[30] Foreign Application Priority Data

Jun. 26, 1980 [CA] Canada .................................. 354,838

[51] Int. Cl.[4] .......................... F28D 15/00; F24J 3/02
[52] U.S. Cl. .......................... 165/104.22; 165/104.29; 126/433; 126/435; 417/208; 137/337
[58] Field of Search ...................... 165/104.29, 104.22, 165/104.24; 126/433, 434, 435; 417/207, 208; 137/337

[56] References Cited

U.S. PATENT DOCUMENTS 4,290,417  9/1981  Peters et al. ........................ 126/434

FOREIGN PATENT DOCUMENTS 637615  12/1978  U.S.S.R. .......................... 165/104.22

Primary Examiner—Albert W. Davis, Jr.
Attorney, Agent, or Firm—Richard J. Hicks

[57] ABSTRACT

An apparatus and method for circulating a heat transfer liquid from a heat collector, which is generally but not essentially a solar collector, to a heat exchanger or heat storage means which is located at a level below that of the heat collector without the use of any externally powered pumps. The heat transfer liquid is at least partially vaporized in the steeply sloped collector and the vapor/liquid rises in a series of "slugs" to a condenser located adjacent the top end thereof. The vapor is condensed and the hot liquid is forced downwardly to the heat exchanger by the pressure of the rising slugs of vapor and liquid. After giving up useful heat in the heat exchanger the now cooled liquid is recirculated to the condenser and thence to the collector.

3 Claims, 6 Drawing Figures

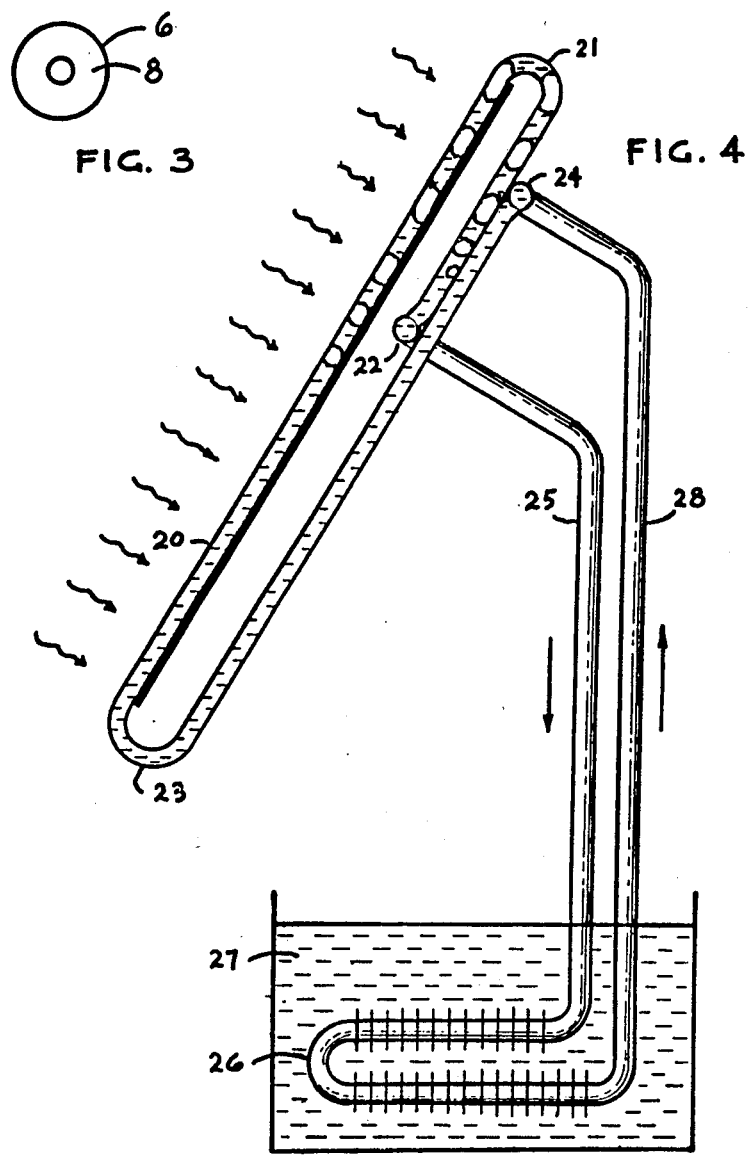

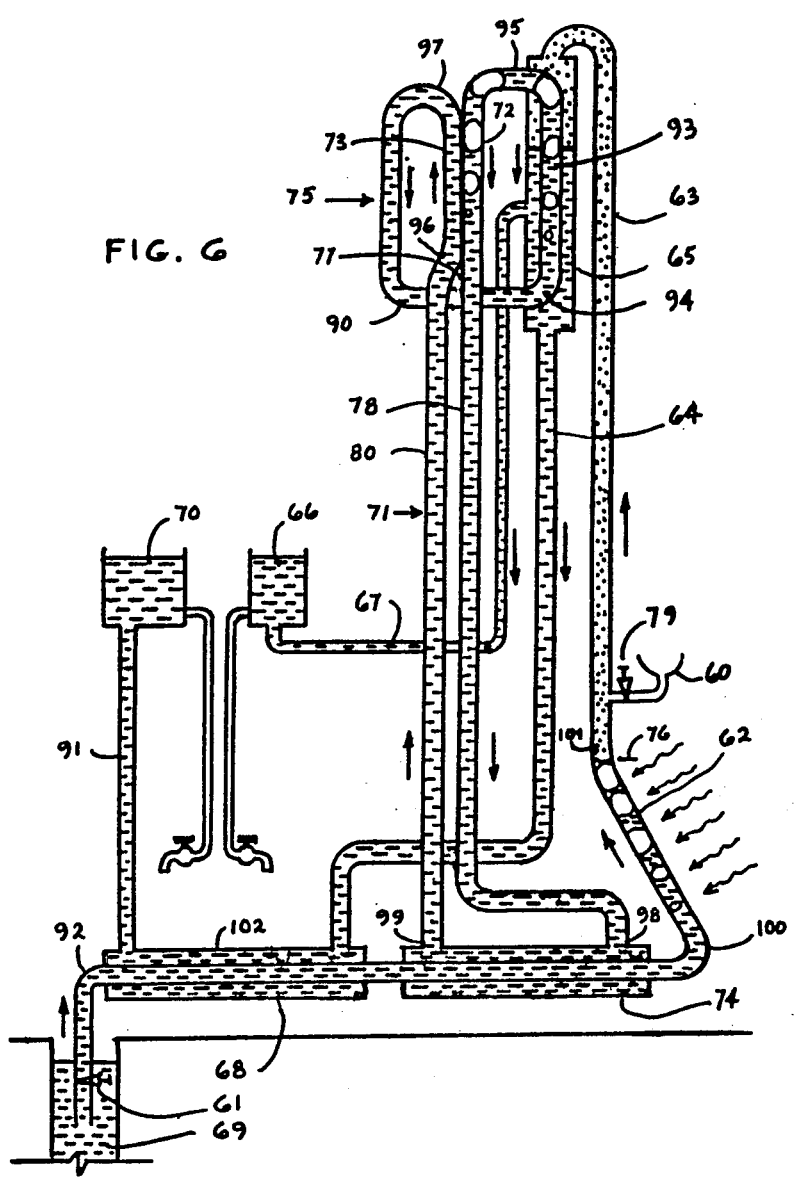

HEAT ACTUATED SYSTEM FOR CIRCULATING HEAT TRANSFER FLUIDS

BACKGROUND OF THE INVENTION

This invention relates to the circulation of heat transfer liquids in solar heat collection and storage systems and other liquid heating devices particularly those where the source of heat is not easily interrupted when the source of power used to circulate the heat transfer liquid is interrupted.

It is common with most solar heat collecting systems which operate with liquids as the heat transfer medium that a pump, usually electrically powered, is used to move the fluid. The disadvantages of this method of circulating the liquid are listed below:

1. power must be provided from outside which is usually costly, sometimes unreliable and in many locations unavailable;
2. a motor and pump must be provided which require capital outlay, periodic maintenance, and replacement when worn out or neglected;
3. motor and pump noises are usually objectionable;
4. temperature sensing switches must be used to start and stop the circulating pump; and
5. power source interruption and/or equipment failure make certain safety devices and/or shut down facilities necessary because the source of heat, whether sun or fossil fuel, continues to put energy into the system. These devices and facilities add to initial cost and are in themselves potential sources of failure resulting in danger.

In warmer climates the storage tank and heat exchanger or solar water devices are located above the level of the collector to make use of convection forces to induce circulation and avoiding the need for circulating pumps. In colder climates there are seldom insulated parts of building higher than the solar collector where a storage tank can be placed. For purposes of solar space heating the size of the tanks required to allow for relatively long periods of no sun would dictate an expensive support structure. It has therefore become common practice to provide a storage tank/heat exchanger at ground or basement level and to rely on a circulating pump and control devices to transfer the heat to it from the collector.

OBJECT OF THE INVENTION

An object of the present invention is to provide a method and apparatus whereby a heat transfer liquid may be circulated to a heat exchanger below the level of the heat collector without requiring the use of external pumps.

By one aspect of this invention there is provided apparatus for autogenously circulating heat transfer liquids from a heat collector to a heat exchanger located at a level below that of the heat collector, comprising:

(a) a collector comprising a plurality of fluid passage means, for a fluid to be vaporized at least partially therein by a heat source, inclined upwardly from a lower inlet toward an upper outlet thereof;

(b) means for condensing vapour in said fluid passage means, located adjacent said upper outlet of said collector, surrounding said fluid passage means, and having an inlet and an outlet;

(c) heat exchanger means, at a level below said collector, having an inlet and an outlet thereto;

(d) first conduit means providing a fluid flowpath between said fluid passage means and said inlet to said heat exchanger means;

(e) second conduit means providing a fluid flowpath between the outlet of said heat exchanger means and the inlet of said condenser; and (f) third conduit means providing a fluid flowpath between the outlet of said condenser and the inlet to said collector.

By another aspect of this invention there is provided a method for autogenous circulation of heat transfer liquids from a heat collector to a heat exchanger located at a level below that of the heat collector, comprising:

(a) providing a plurality of fluid flow passages that each have a flowpath inclined upwardly from a lower position to a higher position;

(b) providing means for condensing vapour within said fluid flow passages at a position adjacent said higher position;

(c) providing heat exchange means at a position below said lower position;

(d) providing fluid flowpath means from said flow passages through said condensing means and said heat exchange means so as to return the heat transfer liquid to said lower position;

(e) heating said plurality of fluid flow passages so as to at least partially vaporize a liquid flowing therethrough;

(f) directing said liquid and vapour through said condensing means so as to condense said vapour;

(g) passing said liquid and condensed vapour through said heat exchange means to thereby cool the same;

(h) preheating the cooled liquid from said heat exchange means by passage through said condensing means externally of said fluid passages; and (i) recirculating said preheated liquid to the lower position of the fluid flow passages.

DESCRIPTION OF THE DRAWINGS

In the drawings which illustrate an embodiment of the invention:

FIG. 3 is a section of the line III—III of FIG. 1;

FIG. 4 is a sketch of an alternative form of a closed loop condenser-solar collector system;

FIG. 6 is a schematic diagram of a device for lifting water and providing domestic hot and cold water, without the use of external pumping arrangements.

DETAILED DESCRIPTION

Figure 1:
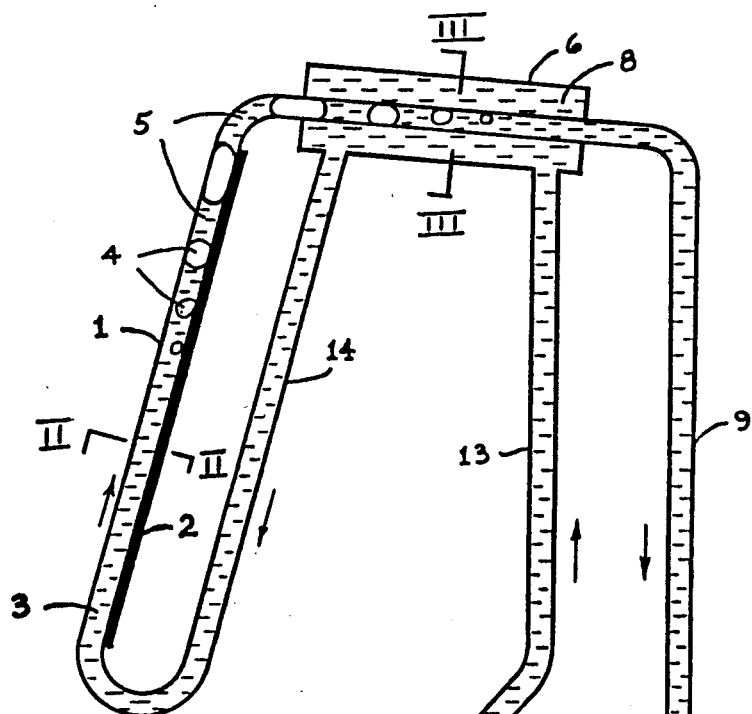
FIG. 1 shows schematically the relationship of the parts of one embodiment.
Figure 2:
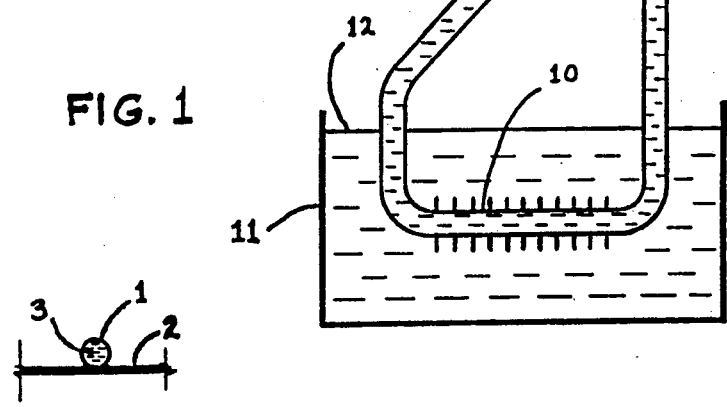
FIG. 2 is a section of the line II—II of FIG. 1.

While these drawings show a flat plate solar collector as the heat source this invention is intended to apply to systems using other types of solar collectors and other heat sources, the arrangement of parts will be very similar for them and therefore they are not illustrated herein.

Tube 1 gathers solar heat both incident upon it and conducted to it from plate 2 causing the liquid 3 to rise in temperature and boil in turn causing gas bubbles 4 to form and move upward in tube 1. With proper sizing of the tube to suit the viscosity of the liquid, the gas bubbles will enlarge to the inside diameter of tube 1 producing cylinders of upward moving liquid 5. At the top of the plate the tube is redirected to allow the liquid and gas bubbles to flow slightly down hill through condenser 6. The gas bubbles give up their latent heat to the surrounding liquid 8 thereby decreasing in size and steadily reverting to liquid. The heated liquid now joined by the liquid of the condensed bubbles descends in tube 9 to the heat exchanger 10 in storage tank 11. After giving up some heat to the contents 12 of the storage tank, the liquid is pulled up through tube 13 to condenser 6 where it picks up heat from the aforementioned condensing gas bubbles. The liquid then descends by tube 14 to the bottom of tube 1 attached to the flat plate solar heat collector 2 and starts the cycle over again.

The closed system of piping shown is well suited to the use of a liquid which will not freeze in winter conditions at times when the sun is not shining because no drain down provision or covering over of the collector panel with insulation is needed. By presetting the pressure within the system, the most favourable boiling temperature can be selected for the particular collector being used.

If desired a one way flow valve may be incorporated in the liquid flowpath so as to prevent possible reverse flow of heat transfer liquid by convection forces in the event that the temperature of the heat source drops below the temperature of the rest of the system. Alternatively, sufficient gas can be incorporated in tube 1 to act as a dam to prevent back siphoning.

Where freezing in the collector can be avoided, or where the collector is not adversely affected by freezing of the liquid, heat exchanger 10 in storage tank 11 can be eliminated and the liquid 12 in the storage tank can be allowed to go directly through the system for somewhat greater efficiency.

EXAMPLE

An apparatus as illustrated in FIG. 1, with the addition of an expansion or surge tank in conduit 9 between heat exchanger 6 and heat sink 11, was constructed and a pair of tubes 3 were filled with pure methanol. The total working volume of fluid was 0.5 liters with a gas volume of approximately 0.1 liters. A partial vacuum was drawn using a side arm on the surge tank for this purpose. The heat sink 11 was located 50 cms below the bottom of the heat source. Heat was applied to the tube 1 and the system allowed to come to a steady state. The outlet temperature to tube 1 was found to be 43° C., the inlet temperature to heat sink 11 was 28° C., the outlet temperature from heat sink 11 was 22° C., and the inlet temperature to pipe 1 was 32° C. These results clearly indicate that liquid heated at a relatively high level can be forced to a lower level without external pumping, under the influence of the pumping action of the "slugs" of vapour generated within pipe 1, and there used to perform useful external work, i.e. heating the liquid in the heat sink.

Figure 5:
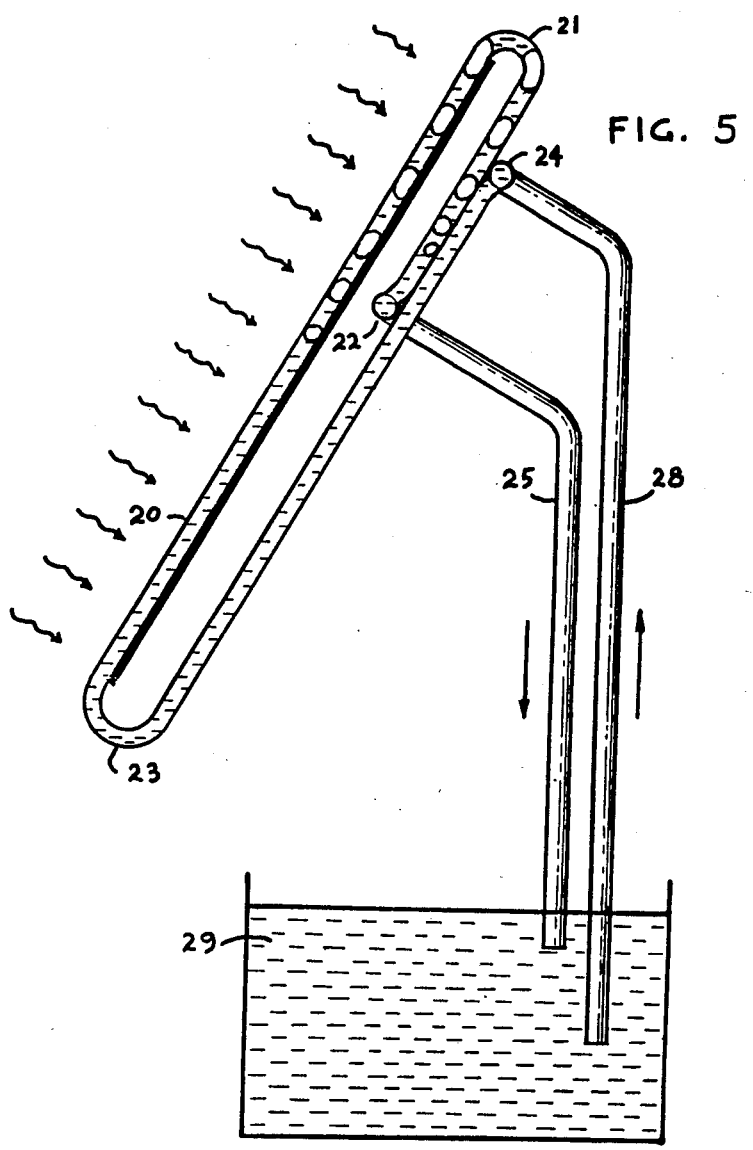
FIG. 5 is a sketch of a solar collector system with an open heat sink.

FIG. 4 shows a closed loop system in which the collector comprises a plurality of steeply inclined tubes 20 sharply curved at the upper ends 21 thereof to form an inverted U-shape, and terminating in a "hot" header 22. The lower ends 23 of tubes 20 are also sharply bent to form a U-shape and the end thereof terminates at a "cold" header 24. The opposite ends of tubes 20, lying between headers 22 and 24 are arranged in close parallel heat exchange relationship so that vapour travelling around bend 21 is at least partially condensed by the time it reaches header 22. Similarly, liquid flowing from the cold header 24 towards bend 23 is preheated. The somewhat cooled liquid in header 22 is forced downwardly through conduit 25 to a heat exchanger 26 in heat sink 27, located at a lower level than collector 20, under the pressure exerted by the liquid-vapour rising in collector 20. After cooling in exchanger 26 the cool liquid returns to the "cold" header 24 via conduit 28, and thence is preheated and circulates back to collector 20. An open system is illustrated in FIG. 5 and is similar to that shown in FIG. 4 except that a heat sink tank 29 is provided and the heat exchanger 26 is eliminated. Hot water enters the top of tank 29 via conduit 25 and colder water leaves tank 29 via return conduit 28, from a position adjacent the bottom thereof.

FIG. 6 illustrates the "bubble pump" principle of the present invention as applied to a domestic water system which pumps water from a source, such as a well, in addition to providing hot and cold water storage. After initial priming of the system with water through filler 60 with valve 61 closed, valve 79 is closed and valve 61 is opened. The water from inlet 100 in an array of steeply inclined collector pipes 62 is exposed to a heat source, such as solar energy. As the system is essentially under reduced pressure, it can be arranged that water vapour at a temperature as low as about 49° C. is produced. Vapour rises through one leg of U-shaped conduit 63. The other leg 64 of U-shaped conduit is provided with a heat exchanger 65 which serves to cool the vapour sufficiently so as to condense the vapour at the lower end of exchanger 65. Part of the condensed liquid is transferred to a hot water storage tank 66 via conduit 67 while the remainder is directed along conduit 64 to the inlet of a second heat exchanger 68. After giving up more of its heat to cold water drawn into the system from the water source or well 69 via pipe 92, the cold water is directed via pipe 91 to cold water storage tank 70. A closed loop heating and cooling circuit 71 containing a liquid which vaporizes at a temperature lower than the temperature at which the liquid in pipes 62 vaporizes at the level of the heat input is also provided. Liquid contained in conduit 72 is passed countercurrent from inlet 94 to outlet 95, to the flow of liquid and vapour in conduit 65 and in heat exchange relation 93 therewith, thereby cooling and condensing the vapour in conduit 65 and at least partially vaporizing the fluid in conduit 72, which together with conduit 77 is in the shape of an inverted U, so that the vapor rises in conduit 72 and flows downwardly in conduit 77. The fluid in the downwardly directed leg passes in heat exchange relation with a cold liquid in a further inverted U-shaped conduit 73, as described in more detail hereinafter, and is directed to the intake 98 of a third heat exchanger 74 where its heat is used to further preheat water drawn from well 69 on passage to collector 62. The cooled liquid exiting from exchanger 74 at 99 is forced by the pressure of the vaporizing liquid in conduit 72, upwardly in conduit 73 to provide the cold liquid between 96 and 97 used to cool the descending hot vapour and liquid in conduit 77.

The preheated liquid exiting at 90 from conduit 73 provides the inlet liquid at 94 to conduit 72, thereby closing the circuit.

The height of the heat recovery loop 75 above the storage tanks 66 and 70 is limited by atmospheric pressure, which at sea level will support a column of water to a maximum of about 9 meters when the water temperature is 49° C. (as in a manometer). Similar considerations apply with respect to the "lift" which is possible between the surface of the water in well 69 and the top 76 of collector 62. The height of the high water level of storage tanks 66 and 70 above top 76 of collector 62 is limited primarily by the maximum vertical distance which closed loop heating and cooling circuit 71 is capable of transferring heat and secondly by the internal friction of the water in the piping.

The maximum vertical distance which closed loop heating and cooling circuit 71 can operate at is limited by: the difference in density of the liquid and gas mixture in conduits 77 and 72×their height+pressure losses due to friction in this section=the difference in density of the liquid in conduits 80 and 78×their height+pressure losses due to friction in this section.

I claim:

1. Apparatus for autogenously circulating heat transfer liquids from a heat collector to a heat exchanger located at a level below that of the heat collector, comprising:
(a) a collector 93 comprising a plurality of fluid passage means, for a fluid to be vaporized at least partially therein by a heat source 65, inclined upwardly from a lower inlet 94 toward an upper outlet 95 thereof;
(b) means 73 for condensing vapour in said fluid passage means 72 located adjacent said upper outlet of said collector, surrounding said fluid passage means, and having an inlet 96 and an outlet 97;
(c) heat exchanger means 74, at a level below said collector, having an inlet 98 and an outlet 99 thereto;
(d) first conduit means 78 providing a fluid flowpath between said fluid passage means and said inlet 98 to said heat exchanger means;
(e) second conduit means 80 providing a fluid flowpath between the outlet 99 of said heat exchanger means and the inlet 96 of said condenser;
(f) third conduit means 90 providing a fluid flowpath between the outlet 97 of said condenser and the inlet 94 to said collector;
(g) a second heat collector 62 including a plurality of fluid passage means, for a second fluid to be vaporized at least partially therein by a second heat source, inclined upwardly from a lower inlet 100 toward an upper outlet 101 thereof, and means 65 for condensing vapour of said second fluid above the upper end of said second collector, said condensing means providing the first said heat source for heating said fluid;
(h) conduit means 67 to convey at least a portion of condensed said second fluid to a hot storage means 66;
(i) conduit means 91 to convey at least a portion of condensed said second fluid to a cold fluid storage means 70; and
(j) fluid passage means between said inlet to second collector means and a source of said second fluid located at a level below said second collector in heat relationship to said heat exchange means, to draw said second fluid into said second collector as vaporization occurs in said second collector.

2. Apparatus as claimed in claim 1 including second heat exchange means 102 in said conduit means 92 between condensing means 65 for said second fluid and said cold fluid storage means 70

3. Apparatus as claimed in claim 2 wherein said second heat exchange means is arranged to preheat said second fluid in said fluid passage means between said source thereof and said second collector.

* * * * *